(12) United States Patent
Perry

(10) Patent No.: US 9,568,918 B1
(45) Date of Patent: Feb. 14, 2017

(54) BALLOON SYSTEM

(71) Applicant: Southwest Research Institute, San Antonio, TX (US)

(72) Inventor: William D. Perry, Helotes, TX (US)

(73) Assignee: SOUTHWEST RESEARCH INSTITUTE, San Antonio, TX (US)

( * ) Notice: Subject to any disclaimer, the term of this patent is extended or adjusted under 35 U.S.C. 154(b) by 0 days.

(21) Appl. No.: 14/837,638

(22) Filed: Aug. 27, 2015

(51) Int. Cl.
*G05D 1/04* (2006.01)
*B64B 1/44* (2006.01)

(52) U.S. Cl.
CPC ............. *G05D 1/042* (2013.01); *B64B 1/44* (2013.01)

(58) Field of Classification Search
CPC .................................. G05D 1/042; B64B 1/44
USPC .............................................. 701/4
See application file for complete search history.

(56) References Cited

U.S. PATENT DOCUMENTS

| | | | |
|---|---|---|---|
| 3,592,157 A | 7/1971 | Schwartz | |
| 4,092,830 A | 6/1978 | Rilett | |
| 6,324,982 B1 | 12/2001 | Eybert-Berard et al. | |
| 6,537,271 B1 * | 3/2003 | Murray | A61B 18/02 606/21 |
| 7,469,857 B2 | 12/2008 | Voss | |
| 7,707,938 B2 | 5/2010 | Hisel | |
| 7,727,228 B2 * | 6/2010 | Abboud | A61B 18/02 606/21 |
| 8,986,293 B2 * | 3/2015 | Desrochers | A61B 18/02 606/21 |
| 9,050,073 B2 * | 6/2015 | Newell | A61B 18/02 |
| 9,414,878 B1 * | 8/2016 | Wu | A61B 18/02 |
| 2002/0179771 A1 | 12/2002 | Senepart | |
| 2015/0196345 A1 * | 7/2015 | Newell | A61B 18/02 606/21 |

FOREIGN PATENT DOCUMENTS

WO       2005081680 A2       9/2005

OTHER PUBLICATIONS

Swartwout, et al; "Integrating Hands-On Design Education and Faculty Research at Washington University"; American Institute of Aeronautics and Astronautics, Space 2004 Conference and Exhibit, Sep. 28-30, San Diego, CA, AIAA 2004-5816 (1 pg).
Strom, et al; "Balloon-Supported Platforms in Communications"; Chapter XXIII in Aerospace Instrumentation Laboratory, Project 6665 Air Force Cambridge Research Laboratories; L. G. Hanscom Field, Bedford, MA; AFCRL-65-486, Jul. 1965, Air Force Surveys in Geophysics, No. 167, Proceedings 1964 AFCRL Scientific Balloon Symposium, (pp. 273-278).
Yajima, et al; "Technology and Applications of Exploration Ballones Floating in the Stratosphere and the Atmospheres of Other Planets"; <<http://www.springer.com/978-0-387-09725-1"; Chapt. 2 Engineering Fundamentals of Balloons", pp. 15-75.

* cited by examiner

*Primary Examiner* — Mcdieunel Marc
*Assistant Examiner* — James E Stroud
(74) *Attorney, Agent, or Firm* — Grossman, Tucker et al

(57) ABSTRACT

The present disclosure relates to a balloon system that includes a flexible volume balloon hull configured to contain a lifting gas, a flexible volume ballonet contained within said balloon hull configured to contain a refrigerant gas and a refrigerant gas transfer device in fluid communication with the ballonet to control the balloon's vertical ascent and descent.

13 Claims, 1 Drawing Sheet

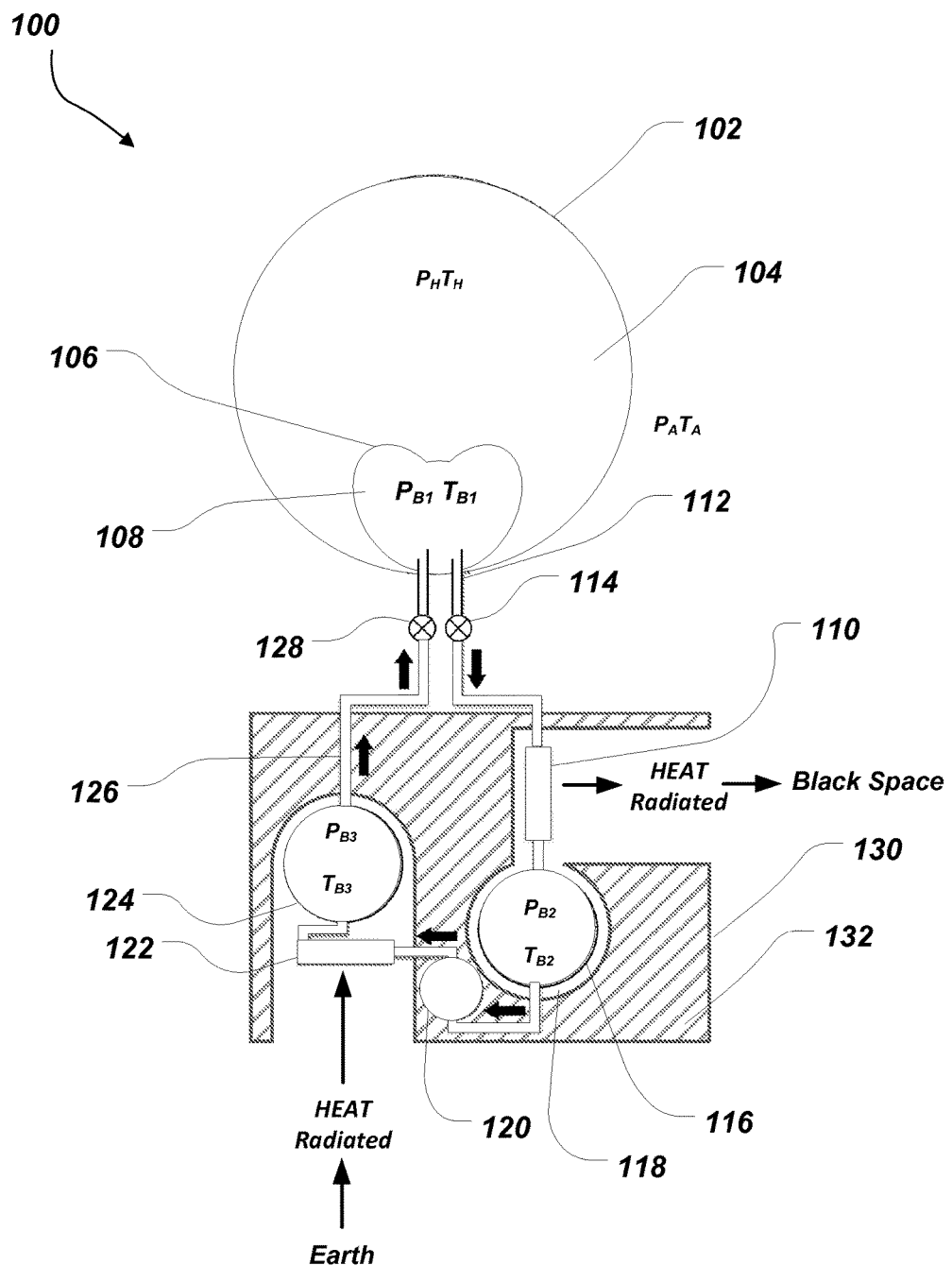

BALLOON SYSTEM

TECHNICAL FIELD

The present disclosure relates to a balloon system that provides relatively constant lift to a balloon over relatively long duration, thereby providing extended flights at relatively constant altitude or allows the particular target float altitude to be changed as desired. The gas system comprises a balloon hull containing a lift gas, a ballonet containing refrigerant gas, and a refrigerant gas transfer device in fluid communication with the ballonet. The refrigerant gas transfer device is configured to release refrigerant gas into the ballonet or provide removal of refrigerant gas from the ballonet.

BACKGROUND

Stratospheric balloons are used for a wide range of science, military and commercial applications. In most of these applications longer duration flights are needed. One example is the Google Balloon Constellation program called "LOON." The LOON program is a platform that can provide internet service to large areas of the world that presently do not have the needed telecommunications landline infrastructure. Hence, it requires balloons that can maintain flight for extended periods of time.

Presently there are two common types of stratospheric balloons, the zero-pressure balloon and the super-pressure balloon. Zero-pressure balloons are partially inflated with a lifting gas, with the gas pressure the same both inside and outside the balloon. As the zero-pressure balloon rises, the gas expands to maintain the zero pressure difference, and the balloon's envelope will inflate. More specifically, the balloon keeps ascending until the envelope reaches maximum volume and then, any excess lifting gas spills out a vent at the bottom of the balloon, resulting in the pressure of the lifting gas being equal to the atmospheric pressure at the target altitude. Since the maximum pressure in the balloon hull is only slightly higher than the atmospheric pressure, the balloon can be fabricated from relatively low strength ductile film like polyethylene. These balloons have proven to be relatively inexpensive and reliable. The problem with using zero-pressure balloons for extended flight periods is when the balloon is at float, the sun heats the gas causing it to expand and causing the gas excess volume to be spilled through the vent. When the sun sets, the lifting gas cools and contracts, as a result the volume of the balloon is reduced, which in turn reduces the lift. To keep the balloon afloat through the night, ballast must be dropped to arrest the descent. The balloon then climbs until the balloon hull is again fully extended. At each diurnal cycle, more lifting gas and ballast are lost. This depletion of lifting gas and ballast limits the duration of zero-pressure balloon flights to at most a few days when the ballast is exhausted. The one exception is flights at the poles during the summer, where there is sunlight for 24 hours a day, these flights can last for many more days.

Super-pressure balloons use hulls made of relatively high strength material that can contain the lifting gas at a pressure higher than the surrounding atmosphere. These balloons are filled with enough gas to expand the hull completely at the lowest temperature that would be encountered during the flight. Unlike the zero-pressure balloons, no vent and ballast are required for extended flights. During the day when temperature of the gas increases, it produces an increase in the internal pressure of the balloon. The hull must be capable of handling the large stresses produced by this pressure increase. These super-pressure balloons are relatively expensive to manufacture due to the high strength hull material needed and tight fabrication tolerances required. These balloons can produce extended flight duration, but the failure rate has been relatively high limiting their widespread use.

In addition, there have been reports of certain dual-balloon type systems. These may include, e.g., a tandem type balloon, where the balloons are situated above and below a given payload. In addition, there have been reports of double-envelope type balloons, where a super-pressure balloon is contained within a zero-pressure type balloon, where the volume of the zero-pressure balloon is greater than the contained super-pressure balloon. In this configuration, the relatively small super-pressure balloon is used for controlling altitude while the relatively large zero-pressure balloon is used for lifting the payload.

Reference is also made to U.S. Pat. No. 7,469,857 entitled "System and Method For Altitude Control." According to the abstract this disclosure provides a differential expansion system and method for balloon buoyancy control which includes a zero-pressure envelope and a super-pressure envelope.

Accordingly, there remains a need for balloon systems that might offer a combination of the benefits of a zero-pressure balloon (e.g. the use of relatively low strength ductile film as a balloon material) but which would otherwise provide the longevity of flight duration super-pressure balloon (e.g., relatively long flight duration at targeted altitudes in fluctuating temperature conditions).

SUMMARY

The present disclosure relates to a gas balloon system and associated method that provides relatively constant lift to a balloon over relatively long duration, thereby providing extended flights at relatively constant altitude, or allows the particular target float altitude to be changed as desired. The need for expendable ballast is eliminated. The balloon system comprises a balloon hull containing a lift gas, a ballonet containing refrigerant gas, and a refrigerant gas transfer device in fluid communication with the ballonet. The refrigerant gas transfer device is configured to release refrigerant gas into the ballonet and/or provide removal of refrigerant gas from the ballonet.

The balloon may be further equipped with a processor to control the operation of the refrigerant gas transfer device as a function of the temperature and/or pressure inside the balloon hull. The balloon may be further equipped with instrumentation to carry a mission, such as cameras, radars, thermometers, pressure gauges, spectrometers, radio receivers-transmitters, etc.

BRIEF DESCRIPTION OF THE DRAWINGS

The various features and advantages of the present disclosure will be better understood by reading the following detailed description, taken together with the drawings wherein:

FIG. 1 is a diagrammatic representation of a balloon system according to one embodiment of the invention.

DETAILED DESCRIPTION

The outer balloon hull herein can be preferably made of relatively low cost, polymeric type film filled to fully contain a lifting gas such as helium or hydrogen. Reference to polymeric type film therefore includes a number of synthetic or naturally occurring polymeric resins including, but not limited to polyethylene, polypropylene, poly(vinyl chloride), poly(ethylene terephthalate), cellulosic polymers such as cellulose esters, polyamides, and fluoropolymers. Film/fabric combinations, while less preferred, may also be utilized where the fabric may include aramid materials such as KEVLAR™ and liquid crystalline aromatic polyester fibers such as those sold under the trademark VECTRAN™.

As noted, the balloon hull is such that it contains the lifting gas and also has sufficient strength to retain the lifting gas at a target altitude. It may therefore be appreciated that the polymeric material for the balloon hull is such that it has sufficient mechanical strength to withstand a certain maximum pressure in the balloon hull, which will only be equal to or slightly higher than atmospheric pressure. Preferably, the pressure in the balloon hull will only be 0.1-5% higher than atmospheric pressure, and more preferably only 0.1-2.5% higher than atmospheric pressure.

With regards to preferable material for the balloon hull, such material may now be selected from those polymer films that will accommodate such relatively low pressure requirements. In such regard, the balloon hull herein may be preferably constructed from material that accommodates differing volumes such as polyethylene film material at a thickness of 0.0005" to 0.010". Accordingly, the polymer film materials herein that will serve as a balloon hull material may preferably include, but not be limited to, those materials which have a tensile strength in the range of 500 psi to 5000 psi. Such materials place the balloon hull herein in the category of relatively inexpensive balloon construction as compared to those materials traditionally employed for super-pressure balloon hulls.

Within the outer balloon hull is now placed a ballonet, which is reference to a relatively smaller size balloon within the balloon hull that is configured to contain a refrigerant gas (i.e. a fluid that is capable of undergoing phase transition from a liquid to a gas) such as ammonia or a hydrocarbon type gas such as butane or propane. The ballonet may be made out of similar materials to the balloon hull noted above such as polyethylene and capable of inflating to selected and differing volume levels by the refrigerant gas. As described more fully below, preferably, the refrigerant gas herein is selected from butane ($C_4H_{10}$).

Generally, in a first representative embodiment, the operation of the balloon herein starts with partial filling of the balloon hull with a lifting gas (e.g. helium) where the amount of helium fill is designed to lift the balloon to a targeted altitude. At such altitude, the helium will therefore expand and be retained by the balloon hull and the balloon hull volume will reach a targeted maximum volume ($V_{max}$) at a selected lift altitude for a given expected lift gas temperature that will be experienced during flight. At such maximum volume or $V_{max}$, the internal-external pressure differential of the balloon (i.e. the difference in pressure as between the lift gas pressure exerted on the balloon hull and the external atmospheric pressure) is relatively small, preferably falling in the range of 0.1-5.0% of the atmospheric pressure at float altitude.

Under nighttime conditions, the lifting gas will then cool and contract and lead to a reduction in volume of the balloon hull. It is contemplated, e.g., that the reduction in volume of the lift gas may be in the range of up to 25.0% of $V_{max}$. More specifically, the reduction in volume will be dependent upon factors such as the amount of lifting gas present as well as the specific temperature drop that the lifting gas may experience. As may be appreciated, if there is relatively large temperature drop in lift gas temperature, there will be a relatively large drop in volume of the balloon hull. Accordingly, the volume reduction due to temperature loss may be in the range of 0.1% to 25.0% of $V_{max}$ which volume reduction, as described herein, is now compensated for by the presence of the inner ballonet in communication with the refrigerant gas transfer device.

Namely, to compensate for a reduction in lift gas volume and resulting loss in lift, refrigerant gas (e.g. butane) can now be released from a storage compartment of the liquid refrigerant into the ballonet. The injection of refrigerant gas can therefore now be regulated to maintain the full expanded volume of the balloon ($V_{max}$). More specifically, upon releasing of refrigerant gas into the ballonet, the balloon hull can preferably be maintained in the range of 0.95-1.05 ($V_{max}$). Since the volume of the balloon hull can now be controlled in such manner, the balloon system herein can be configured such that it will not significantly drop in altitude during a temperature drop condition which of course will typically occur after sunset or during other weather pattern type shifts. It is contemplated herein that the particular target altitude of the balloon can now be maintained relatively constant, such as in the range of plus or minus 0 feet to plus or minus 5000 feet. For example, the target altitude may, e.g., be maintained in the range of plus or minus 0 feet, or plus or minus 50 feet, or plus or minus 100 feet, or plus or minus 150 feet, or plus or minus 200 feet, etc., up to plus or minus 5000 feet. Accordingly, the target altitude may be maintained at plus or minus 500 feet, plus or minus 1000 feet, plus or minus 2000 feet, plus or minus 3000 feet, or plus or minus 4000 feet. In addition, any such maintaining of the target altitude at the indicated ranges is now accomplished without the use of expendable ballast, as has been the case in zero pressure balloon designs.

Moreover, as the volume of the balloon hull can be controlled in the manner noted herein, the particular target altitude can also be set as desired. That is, the particular target float altitude of the balloon where it is intended to hold a relatively constant altitude, as noted above, can be regulated by similarly increasing or decreasing the ballonet volume to increase or decrease the volume of the outer balloon hull.

It may now be appreciated that in the morning, when the lifting gas temperature starts to rise due to environmental heating, the lifting gas pressure will compresses the ballonet. The refrigerant gas will then pass through an opened valve and be removed from the ballonet and can be cooled to condense such gas to a liquid state in a second storage compartment. More specifically, the refrigerant gas is conveniently directed through a radiator/condenser that radiates heat to black space to promote cooling and condensing of the gas as noted.

By using a combination of a radiator/condenser that radiates heat to black space and a radiator/evaporator that captures heat from the surface of the earth, little or no electrical energy is required. The system may therefore be configured to preferably use butane as the refrigerant gas, which can be condensed without additional compression. Other refrigerant gases, such as ammonia or propane, may require a relatively small compressor (e.g. 0.25 horsepower to 5.0 horsepower) to allow the gas to condense.

Referring to FIG. 1, in one example of the present invention, the balloon system 100, is flying in the atmosphere having a pressure ($P_A$) and temperature ($T_A$) which can vary throughout, e.g. the day and night. The balloon system 100 is composed of a flexible volume balloon envelope or hull 102 having a maximum volume $V_{max}$, containing the lifting gas 104. The lifting gas in the balloon hull may be at a pressure ($P_H$) and temperature ($T_H$). Within the balloon hull or envelope 102 is a flexible volume ballonet 106 that can be filled with a refrigerant gas 108 at a first pressure ($P_{B1}$) and temperature ($T_{B1}$). The ballonet 106 is connected to a refrigerant gas transfer device in fluid communication with the ballonet which gas transfer device is configured to inflate or deflate the ballonet and therefore preferably maintain said balloon hull to remain inflated in the range of 0.95-1.05($V_{max}$). The ballonet 106 may itself have a volume that is about 25% of the maximum volume of the balloon hull 102. Accordingly, as noted herein, it may be appreciated that while the inflation and deflation of the ballonet can be employed to maintain the balloon system at a relatively constant targeted altitude, the system is also one that will allow for one to select a particular target altitude where the balloon is intended to float.

The balloon here is particularly well-suited for floating at particular target altitudes above the troposphere and in the stratosphere, which is stratified in temperature, with warmer layers higher up and cooler layer farther down. At moderate latitudes the stratosphere is situated between about 10-13 km (33,000 to 43,000 ft.) and 50 km (160,000 ft.) altitude above the surface, while at the poles it starts at about 8 km (26,000 ft.) altitude, and near the equator it may start as high as 18 km (59,000 ft.).

With attention now back to FIG. 1, the preferred refrigerant gas transfer device contains a radiator/condenser 110 and through-pipes 112. Between the ballonet 106 and radiator/condenser 110 is a valve 114 that can be open and closed depending upon the change in outside temperature or internal temperature and pressure of hull 102 operated by a control system. Valve 114 will therefore allow for removal of refrigerant gas from ballonet 106. The radiator/condenser 110 as illustrated is exposed to the ambient temperature of black space and thus will be cooled and promote release of thermal energy from the refrigerant gas passing therein to the outside, thereby causing the refrigerant gas to cool and contract and/or condense into a liquid phase 116 and collect in a first compartment 118 where it resides at a second temperature and pressure ($T_{B2}$, $P_{B2}$), where $T_{B2}$ is less than $T_{B1}$ and $P_{B2}$ is less than $P_{B1}$.

A pump 120 is preferably included to direct the liquid refrigerant from the container 118 to pass through a heat-exchanging radiator/evaporator 122 that captures ambient heat radiating from the earth and into container 124 where the refrigerant is heated and resides at a third temperature ($T_{B3}$) and pressure ($P_{B3}$) where $T_{B3}$ is greater than $T_{B2}$ and $P_{B3}$ is greater than $P_{B2}$. Second compartment 124 is connected to the ballonet 106 through pipes 126 and valve 128. Valve 128 upon opening therefore allows for refrigerant gas to be introduced from compartment 124 into ballonet 106. The heat-exchanging radiator/evaporator therefore utilizes the heat radiated from the Earth to vaporize the liquid refrigerant received from second compartment 118.

A housing 130 may be provided to hold the various components of the refrigerant gas system as well as any further instrumentation (not shown) needed. The housing 130 may include an insulation material 132, such as polymeric foam made of polyurethane or polystyrene, to maintain the temperature of the first and second compartments 116, 124 at the desired level. In addition, as can be seen, preferably, heat-exchanging radiator 122 is positioned beneath container 124 and surrounded on three-sides with an opening downwardly facing to better facilitate capture of heat radiating from the earth's surface, such as infrared energy. Radiator/condenser 110 is also preferably surrounded by insulation on three sides, one side of which insulates the radiator/condenser 110 from heat radiating from the earth's surface, but open on one side as shown to allow for environmental cooling to black space.

The balloon system may optionally be further equipped with thermocouples and/or pressure gauges located in each of the balloon hull 102, the ballonet 106, the first 118 and second 124 compartments, which may then be connected to a CPU uploaded with a protocol defining the opening and shutting of valves for letting the refrigerant gas in and out of the ballonet, as well as a pump transferring the liquid refrigerant from the first compartment 118 to the second compartment 124. Alternatively, the valves and pump may be operated by an on-board analogic system triggered by the thermocouples and pressure gauges. The pump and valves may be further powered by portable batteries, or solar panels. Accordingly, upon recognition of cooling of the lifting gas in the balloon hull, and a loss in lift, the CPU may direct valve 128 to open to allow a selected amount of refrigerant gas to enter into the ballonet 106 to maintain the balloon hull at its targeted maximum volume level of expansion ($V_{max}$). Upon recognition of a heating of the lift gas and pressure increase in the balloon hull, the CPU may direct valve 114 to open to allow the refrigerant gas to escape from the ballonet and pass through condenser 110 and liquefy and store in container 118. Accordingly, the present invention provides an altitude controlled balloon that minimizes the day-to-day altitude changes and which can remain at a targeted altitude for relatively long periods of time (up to 365 days) that is energy efficient and requires little or no electrical energy, or only that amount of energy that is available through photo-voltaic solar cells.

In view of the foregoing, it may be appreciated that the present disclosure also relates to an article comprising a non-transitory storage medium having stored thereon instructions that when executed by a machine result in the performance of the steps of the methods as described in the examples above such as, for example, in connection with the description associated with FIG. 1. In some embodiments, the method operations may be implemented in software and executed by a processor or may be implemented in hardware such as, for example, an application specific integrated circuit (ASIC) or field programmable gate array (FPGA).

It should also be appreciated that the functionality described herein for the embodiments of the present invention may therefore be implemented by using hardware, software, or a combination of hardware and software, as desired. If implemented by software, a processor and a machine readable medium are required. The processor may be any type of processor capable of providing the speed and functionality required by the embodiments of the invention. Machine-readable memory includes any non-transitory media capable of storing instructions adapted to be executed by a processor. Non-transitory media include all computer-readable media with the exception of a transitory, propagating signal. Some examples of such memory include, but are not limited to, read-only memory (ROM), random-access memory (RAM), programmable ROM (PROM), erasable programmable ROM (EPROM), electronically erasable programmable ROM (EEPROM), dynamic RAM (DRAM), magnetic disk (e.g., floppy disk and hard drive), optical disk (e.g. CD-ROM), and any other device that can store digital information. The instructions may be stored on a medium in either a compressed and/or encrypted format. The processor may therefore select a particular target altitude for the balloon to float and/or maintain the balloon at such particular target altitude at plus or minus 5000 feet.

As may now also be appreciated, the present invention generally relates to a balloon system that includes a first flexible balloon envelope with a lift gas and a second flexible balloon envelope contained therein as the ballonet. The second flexible ballonet envelope is in fluid communication with a refrigerant gas system for adjusting the first flexible balloon envelope to a selected volume to control its ascent and descent. The first flexible balloon envelope is selected from materials that are suitable (i.e. having sufficient tensile strength) to accommodate an internal-external pressure differential falling in the range of 0.1-5.0% of atmospheric pressure at balloon float altitude.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention, which is not to be limited except by the following claims.

The invention claimed is:

1. A balloon comprising:
    a. a flexible volume balloon hull configured to contain a lifting gas, wherein said flexible volume balloon hull has a maximum volume ($V_{max}$);
    b. a flexible volume ballonet contained within said balloon hull configured to contain a refrigerant gas;
    c. a refrigerant gas transfer device in fluid communication with said ballonet and comprising a radiator/condenser for cooling said refrigerant gas and a radiator/evaporator for heating said refrigerant gas;
    d. a first valve positioned between said ballonet and said radiator/condenser to allow for removal of refrigerant gas from said ballonet;
    e. a second valve positioned between said ballonet and said radiator/evaporator to allow for introduction of refrigerant gas to said ballonet,
        wherein said ballonet is configured to contain refrigerant gas at a first pressure ($P_{B1}$) and temperature ($T_{B1}$) including a first compartment configured to contain refrigerant gas removed from said ballonet at a second pressure ($P_{B2}$) and second temperature ($T_{B2}$), wherein $P_{B2} < P_{B1}$ and $T_{B2} < T_{B1}$.

2. The balloon of claim 1 wherein including a second compartment configured to contain a refrigerant gas for introduction to said ballonet at a third pressure ($P_{B3}$) and third temperature ($T_{B3}$) wherein $P_{B3} > P_{B2}$ and $T_{B3} > T_{B2}$.

3. The balloon of claim 1 wherein said refrigerant gas transfer device includes an insulating housing which exposes said radiator/condenser to environmental cooling and said radiator/evaporator to environmental heating.

4. The balloon of claim 1 wherein said first flexible balloon hull is comprised of materials having sufficient tensile strength to accommodate an internal-external pressure differential falling in the range of 0.1-5.0% of atmospheric pressure at balloon float altitude.

5. The balloon of claim 1 wherein said first flexible balloon hull comprises a material having a tensile strength of 500 psi to 5000 psi.

6. The balloon of claim 1 wherein said flexible volume ballonet comprises a material that has a tensile strength of 500 psi to 5000 psi.

7. The balloon of claim 1, including a processor, wherein said processor has instructions thereon that, in response to the identification of a temperature or pressure change in said balloon hull, opens and closes one of said first or second valves to adjust a level of refrigerant gas in said ballonet.

8. The balloon of claim 1 wherein said removal of refrigerant gas from said ballonet or introduction of refrigerant gas to said ballonet sets the balloon at a particular target altitude.

9. The balloon of claim 1 wherein said removal of refrigerant from said ballonet or introduction of refrigerant gas to said ballonet maintains said balloon at a particular target altitude in the range of plus or minus 0 feet to plus or minus 5000 feet.

10. The balloon of claim 1 wherein said balloon is configured to arrive at a selected target altitude and wherein said target altitude has an associated atmospheric pressure and wherein at $V_{max}$, an internal-external pressure differential of the balloon is in the range of 0.1-5.0% of the atmospheric pressure at target altitude.

11. A method for controlling lift gas volume in a balloon to control balloon altitude comprising:
    a. providing a balloon having: (i) a flexible volume balloon hull configured to contain a lifting gas, wherein said flexible volume balloon hull has a maximum volume ($V_{max}$); (ii) a flexible volume ballonet contained within said balloon hull configured to contain a refrigerant gas; (iii) a refrigerant gas transfer device in fluid communication with said ballonet and comprising a radiator/condenser for cooling said refrigerant gas and a radiator/evaporator for heating said refrigerant gas; (iv) a first valve positioned between said ballonet and said radiator/condenser to allow for removal of refrigerant gas from said ballonet; (v) a second valve positioned between said ballonet and said radiator/evaporator to allow for introduction of refrigerant gas to said ballonet wherein said ballonet is configured to contain refrigerant gas at a first pressure ($P_{B1}$) and temperature ($T_{B1}$) including a first compartment configured to contain refrigerant gas removed from said ballonet at a second pressure ($P_{B2}$) and second temperature ($T_{B2}$), wherein $P_{B2} < P_{B1}$ and $T_{B2} < T_{B1}$; and
    b. transferring refrigerant gas to and from said ballonet to control the vertical ascent and descent of said balloon.

12. The method of claim 11 wherein said removal of refrigerant gas from said ballonet or introduction of refrigerant gas to said ballonet sets the balloon at a particular target altitude to float.

13. The method of claim 11 wherein said removal of refrigerant gas from said ballonet or introduction of refrigerant gas to said ballonet maintains said balloon at a particular target altitude in the range of plus or minus 0 feet to plus or minus 5000 feet.

* * * * *